(12) United States Patent
Hildreth

(10) Patent No.: US 8,983,139 B2
(45) Date of Patent: *Mar. 17, 2015

(54) OPTICAL FLOW BASED TILT SENSOR

(75) Inventor: Evan Hildreth, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 13/532,627

(22) Filed: Jun. 25, 2012

(65) Prior Publication Data

US 2012/0268622 A1    Oct. 25, 2012

Related U.S. Application Data

(63) Continuation of application No. 12/961,050, filed on Dec. 6, 2010, now Pat. No. 8,213,686, which is a continuation of application No. 11/932,819, filed on Oct. 31, 2007, now Pat. No. 7,848,542, which is a continuation of application No. 11/326,610, filed on Jan. 6, 2006, now Pat. No. 7,379,566.

(60) Provisional application No. 60/641,751, filed on Jan. 7, 2005.

(51) Int. Cl.
*G06K 9/00* (2006.01)
*G06F 3/00* (2006.01)
(Continued)

(52) U.S. Cl.
CPC ......... *H04N 1/00307* (2013.01); *G06F 1/1626* (2013.01); *G06F 1/1686* (2013.01); *G06F 3/0346* (2013.01); *G06K 9/00335* (2013.01); *G06K 9/22* (2013.01); *G06T 7/2066* (2013.01); *H04N 1/00323* (2013.01); *H04N 1/00352* (2013.01); *H04N 1/00381* (2013.01); *A63F 2300/1087* (2013.01);
(Continued)

(58) Field of Classification Search
USPC .................. 382/103, 107; 348/208.1–208.16; 715/719–722, 863
See application file for complete search history.

(56) References Cited

U.S. PATENT DOCUMENTS 5,297,061 A    3/1994   Dementhon et al.
5,435,554 A    7/1995   Lipson
(Continued)

FOREIGN PATENT DOCUMENTS

| CN | 1300415 A | 6/2001 |
|---|---|---|
| JP | 8212327 A | 8/1996 |

(Continued)

OTHER PUBLICATIONS

Chinese Office Action issued in Application No. 200680007251.6, mailed Apr. 22, 2010, 9 pages.
(Continued)

*Primary Examiner* — Aaron W Carter
(74) *Attorney, Agent, or Firm* — Kilpatrick Townsend & Stockton LLP

(57) ABSTRACT

A method is described for determining a description of motion of a moving mobile camera to determine a user input to an application. The method may involve capturing a series of images from a moving mobile camera and comparing stationary features present in the series of images. Optical flow analysis may be performed on the series of images to determine a description of motion of the moving mobile camera. Based on the determined motion, a user input to an application may be determined and the application may respond to the user input, for example, by updating a user interface of the application.

26 Claims, 13 Drawing Sheets

(51) Int. Cl.
  *H04N 1/00* (2006.01)
  *G06F 1/16* (2006.01)
  *G06F 3/0346* (2013.01)
  *G06K 9/22* (2006.01)
  *G06T 7/20* (2006.01)
  *H04M 1/725* (2006.01)

(52) U.S. Cl.
  CPC ... *G06F 2200/1637* (2013.01); *H04M 1/72544* (2013.01); *H04M 2250/12* (2013.01); *H04M 2250/52* (2013.01); *H04N 2201/0084* (2013.01); *H04N 2201/0096* (2013.01)
  USPC ......... 382/107; 382/103; 348/208.1; 715/719

(56) References Cited

U.S. PATENT DOCUMENTS

| | | |
|---|---|---|
| 5,485,171 A | 1/1996 | Copper et al. |
| 5,485,749 A | 1/1996 | Nohara et al. |
| 5,487,305 A | 1/1996 | Ristic et al. |
| 5,808,678 A | 9/1998 | Sakaegi |
| 5,852,672 A | 12/1998 | Lu |
| 6,072,496 A | 6/2000 | Guenter et al. |
| 6,075,905 A | 6/2000 | Herman et al. |
| 6,078,329 A * | 6/2000 | Umeki et al. ................ 345/419 |
| 6,104,840 A | 8/2000 | Ejiri et al. |
| 6,195,104 B1 | 2/2001 | Lyons |
| 6,201,554 B1 | 3/2001 | Lands |
| 6,342,917 B1 * | 1/2002 | Amenta .................... 348/207.1 |
| 6,414,672 B2 | 7/2002 | Rekimoto et al. |
| 6,535,114 B1 | 3/2003 | Suzuki et al. |
| 6,628,819 B1 | 9/2003 | Huang et al. |
| 6,640,145 B2 | 10/2003 | Hoffberg et al. |
| 6,683,677 B2 | 1/2004 | Chon et al. |
| RE38,420 E * | 2/2004 | Thomas ....................... 348/140 |
| 6,798,429 B2 | 9/2004 | Bradski |
| 6,805,506 B2 | 10/2004 | Bar-Yona |
| 6,816,151 B2 | 11/2004 | Dellinger |
| 6,850,221 B1 | 2/2005 | Tickle |
| 6,861,946 B2 | 3/2005 | Verplaetse et al. |
| 6,882,864 B2 | 4/2005 | Miyake |
| 6,906,700 B1 | 6/2005 | Armstrong |
| 6,908,388 B2 | 6/2005 | Shimizu et al. |
| 6,937,272 B1 * | 8/2005 | Dance ....................... 348/208.2 |
| 7,015,950 B1 | 3/2006 | Pryor |
| 7,027,037 B2 | 4/2006 | Dowd |
| 7,038,662 B2 | 5/2006 | Noguera |
| 7,181,251 B2 | 2/2007 | Stohr et al. |
| 7,187,412 B1 | 3/2007 | Silverstein |
| 7,236,156 B2 | 6/2007 | Liberty et al. |
| 7,239,301 B2 | 7/2007 | Liberty et al. |
| 7,262,760 B2 | 8/2007 | Liberty |
| 7,271,795 B2 | 9/2007 | Bradski |
| 7,379,566 B2 | 5/2008 | Hildreth |
| 7,598,942 B2 | 10/2009 | Underkoffler et al. |
| 7,601,066 B1 | 10/2009 | Masuyama et al. |
| 7,848,542 B2 | 12/2010 | Hildreth |
| 8,213,686 B2 | 7/2012 | Hildreth |
| 2001/0013950 A1 | 8/2001 | Pornbacher |
| 2002/0109782 A1 | 8/2002 | Ejima et al. |
| 2002/0153188 A1 | 10/2002 | Brandt et al. |
| 2002/0158815 A1 | 10/2002 | Zwern |
| 2003/0038778 A1 | 2/2003 | Noguera |
| 2003/0090593 A1 * | 5/2003 | Xiong ........................... 348/620 |
| 2003/0098841 A1 | 5/2003 | Broussard |
| 2004/0102247 A1 | 5/2004 | Smoot et al. |
| 2004/0147317 A1 * | 7/2004 | Ito et al. ........................... 463/36 |
| 2004/0189720 A1 | 9/2004 | Wilson et al. |
| 2004/0193413 A1 | 9/2004 | Wilson et al. |
| 2004/0257452 A1 | 12/2004 | Chang et al. |
| 2005/0086612 A1 * | 4/2005 | Gettman et al. .............. 715/848 |
| 2005/0110875 A1 | 5/2005 | Ma et al. |
| 2005/0150122 A1 | 7/2005 | Cho et al. |
| 2005/0166163 A1 * | 7/2005 | Chang et al. ................... 715/863 |
| 2005/0232467 A1 * | 10/2005 | Mohri et al. ................... 382/103 |
| 2006/0044289 A1 | 3/2006 | Yee |
| 2006/0046848 A1 | 3/2006 | Abe et al. |
| 2006/0055776 A1 * | 3/2006 | Nobori et al. ................. 348/142 |
| 2006/0078162 A1 * | 4/2006 | Wonneberger ................ 382/103 |
| 2006/0092133 A1 | 5/2006 | Touma et al. |
| 2006/0103854 A1 | 5/2006 | Franke et al. |
| 2006/0177103 A1 * | 8/2006 | Hildreth ........................ 382/107 |
| 2006/0262012 A1 | 11/2006 | Nishikata et al. |
| 2006/0287084 A1 | 12/2006 | Mao et al. |
| 2007/0085849 A1 | 4/2007 | Kosolapov |
| 2007/0111750 A1 | 5/2007 | Stohr et al. |
| 2007/0131850 A1 | 6/2007 | Cofer et al. |
| 2007/0146321 A1 * | 6/2007 | Sohn et al. .................... 345/158 |
| 2007/0165246 A1 | 7/2007 | Kimmel |
| 2007/0186192 A1 | 8/2007 | Wigdor |
| 2008/0014987 A1 | 1/2008 | Kusuda et al. |
| 2008/0137913 A1 * | 6/2008 | Hildreth ........................ 382/107 |

FOREIGN PATENT DOCUMENTS

| | | |
|---|---|---|
| JP | 10240436 A | 9/1998 |
| JP | 3154576 B2 | 4/2001 |
| JP | 2001282447 A | 10/2001 |
| JP | 2002024833 A | 1/2002 |
| JP | 2002081909 A | 3/2002 |
| JP | 2002351603 A | 12/2002 |
| JP | 2003203237 A | 7/2003 |
| JP | 2004274402 A | 9/2004 |
| WO | WO0075914 A1 | 12/2000 |
| WO | WO2004042322 A1 | 5/2004 |
| WO | WO2005039154 A1 | 4/2005 |

OTHER PUBLICATIONS

Chinese Office Action issued in Application No. 200680007251.6, mailed Aug. 14, 2009, 11 pages.

Notification of Transmittal of the International Search Report and The Written Opinion of the International Searching Authority, or the Declaration, PCT/US2006/000295, dated Mar. 27, 2007 (15 pages).

* cited by examiner

OPTICAL FLOW BASED TILT SENSOR

CROSS-REFERENCE TO RELATED APPLICATIONS

This application is a continuation of U.S. patent application Ser. No. 12/961,050, filed Dec. 6, 2010, and entitled "Optical Flow Based Tilt Sensor," which is a continuation of U.S. patent application Ser. No. 11/932,819, filed Oct. 31, 2007, now U.S. Pat. No. 7,848,542, which is a continuation of U.S. patent application Ser. No. 11/326,610, filed Jan. 6, 2006, now U.S. Pat. No. 7,379,566, which claims the benefit of priority of U.S. Provisional Application Ser. No. 60/641,751, filed Jan. 7, 2005 , and all of the foregoing applications are incorporated by reference herein in their entireties for all purposes.

TECHNICAL FIELD

This disclosure relates to motion estimation.

BACKGROUND

Digital cameras capture digital representations of images and may be configured to capture multiple images over a designated time. Processing of digital images may include processing aspects of a single image to determine properties of the single image or processing aspects of a series of images to identify properties of the environment being imaged or attributes of the image capture device. In a process known as optical flow, the placement of objects in a series of images may be compared to determine a relative motion between objects in the images and the image capture device.

SUMMARY

In one general example described herein, a series of images taken from a digital camera may be analyzed to determine the motion of the digital camera and, based on the determined motion, a user input to a device may be determined. Various of the described implementations include one or more of the following features. For example, using optical flow as a tilt sensor in a handheld entertainment device such as a camera phone. A sparse feature set/sparse flow field may be used in order to achieve real-time performance. Non-static scenes may be handled by finding the most typical (or largest statistical cluster) result for the flow field. Position and/or orientation may be calculated relative to an initial position and/or orientation, over an extended span of time. Features may be used on camera phones in which the camera is fixed and aimed away from the user. Implementations/features may be designed for devices with limited processing power.

According to a general aspect, a method includes capturing images from a moving mobile camera and determining a description of motion of the moving mobile camera based on the captured images. The method also includes providing a user interface to an application on an interface device. In an automated manner, a user input to the application is determined based on the determined motion.

Implementations of the above general aspect may include one or more of the following features. For example, the interface device may be physically coupled to the mobile camera or physically integrated in a device including the mobile camera. The moving mobile camera may be physically coupled to a cellular phone.

Determining a description of motion may be performed in an automated manner and may include determining one or more of a magnitude and an orientation. Determining a description of motion may also include using optical flow.

Determining a description of motion of the moving mobile camera may include calculating rotation of the moving mobile camera in two or three degrees of freedom. Determining a description of motion of the moving mobile camera may also include calculating translation of the moving mobile camera.

Determining a description of motion of the moving mobile camera may include calculating motion of the moving mobile camera with respect to an initial position of the moving mobile camera. The initial position of the moving mobile camera may be re-set by an application.

Determining a description of motion of the moving mobile camera may include determining motion of features within the captured images and determining motion of the mobile camera based on the motion of the features. Based on the determined motion of the features, the features may be segmented into a set of moving features that are moving with respect to a real-world frame of reference. Segmenting moving features may include selecting a set of features covering the largest area and disregarding features not selected. Segmenting moving features may also include disregarding features that do not have a direction and magnitude similar to a significant set of features.

Determining a description of motion may include extracting features from the captured images and comparing images to match features present in more than one image. A flow vector for matched features may be determined by calculating the displacement in the position of a feature in a current image relative to the position of the feature in a prior image. Based on the flow vectors determined for the matched features, the motion of the mobile camera is determined.

Extracting features from the captured images may include detecting at least one of corners and edges. Comparing images to match features may include first comparing a block of an image located proximate to the known position of the feature in another image. Comparing images to match features may also include first comparing images at a low resolution and, conditioned on whether a match is found, comparing images at a higher resolution. Determining the motion of the mobile camera based on the flow vectors may include determining the motion of the mobile camera in real-world units by converting the motion determined in image-dependent units.

Capturing images may include capturing a sequence of images. Determining a description of motion of the moving mobile camera may include determining motion for a first feature visible in a first subset of images within the sequence of images. Determining a description of motion of the moving mobile camera may also include determining motion for a second feature visible in a second subset of images within the sequence of images, overlapping partially with the first subset, and the second feature having a fixed physical relationship with the first feature, wherein motion for the second feature is based on the motion for the first feature even though the first feature is not visible in all of the second subset of images. Based on the determined motions for the first and second features, the description of motion of the moving mobile camera may be determined.

The user input may replicate a tilt sensor function and may control a tilt of an object in an application, a motion of a ball in an application, a steering function of a vehicle in an application, a targeting function of an object in an application, a navigation function of an object in an application, a movement of an articulated character in an application, or a movement of particles in a particle simulation application. The user input may be determined when the magnitude of the determined motion is greater than a threshold magnitude. The application may include at least one of a game, a tracking application, and a security application.

According to another general aspect, a portable telephone includes a camera and a display that are each integrally formed in the telephone. The telephone also includes a processing device, physically and communicatively coupled to the camera and the display. The telephone further includes a computer readable medium, physically and communicatively coupled to the processing device. The computer readable medium includes instructions for causing the processing device to perform at least the following: (1) receiving images captured from the camera, (2) determining a description of motion of the telephone based on the received images, (3) providing on the display a user interface to an application, (4) determining, in an automated manner, a user input to the application based on the description of motion of the telephone, and (5) providing the user input to the application.

Implementations of the above general aspect may include various additional features. For example, the computer readable medium may be an integrated part of the processing device.

The various aspects, implementations, and features may be implemented in a variety of manners, even if only described herein in, for example, a single manner. The various aspects, implementations, and features may be implemented using, for example, one or more of a method, an apparatus, an apparatus for performing a method, a program or other set of instructions, an apparatus that includes a program or other set of instructions, a computer readable medium, or a propagated signal. The computer readable medium or propagated signal may include, for example, instructions, software, images, and other data. The various aspects, implementations, and features may also include additional components, such as, for example, a camera.

The details of one or more implementations are set forth in the accompanying drawings and the description below. Other features will be apparent from the description and drawings, and from the claims.

DETAILED DESCRIPTION

Techniques are provided for determining a description of motion of a moving mobile camera to determine a user input to an application. One technique involves capturing a series of images from a moving mobile camera and comparing stationary features present in the series of images. A feature may include an object within an image, any part of an object within an image, and/or a corner or edge of an object within an image. Optical flow analysis is performed on the series of images to determine a description of motion of the moving mobile camera. Based on the determined motion, a user input to an application is determined and the application responds to the user input, for example, by updating a user interface of the application.

Figure 1:
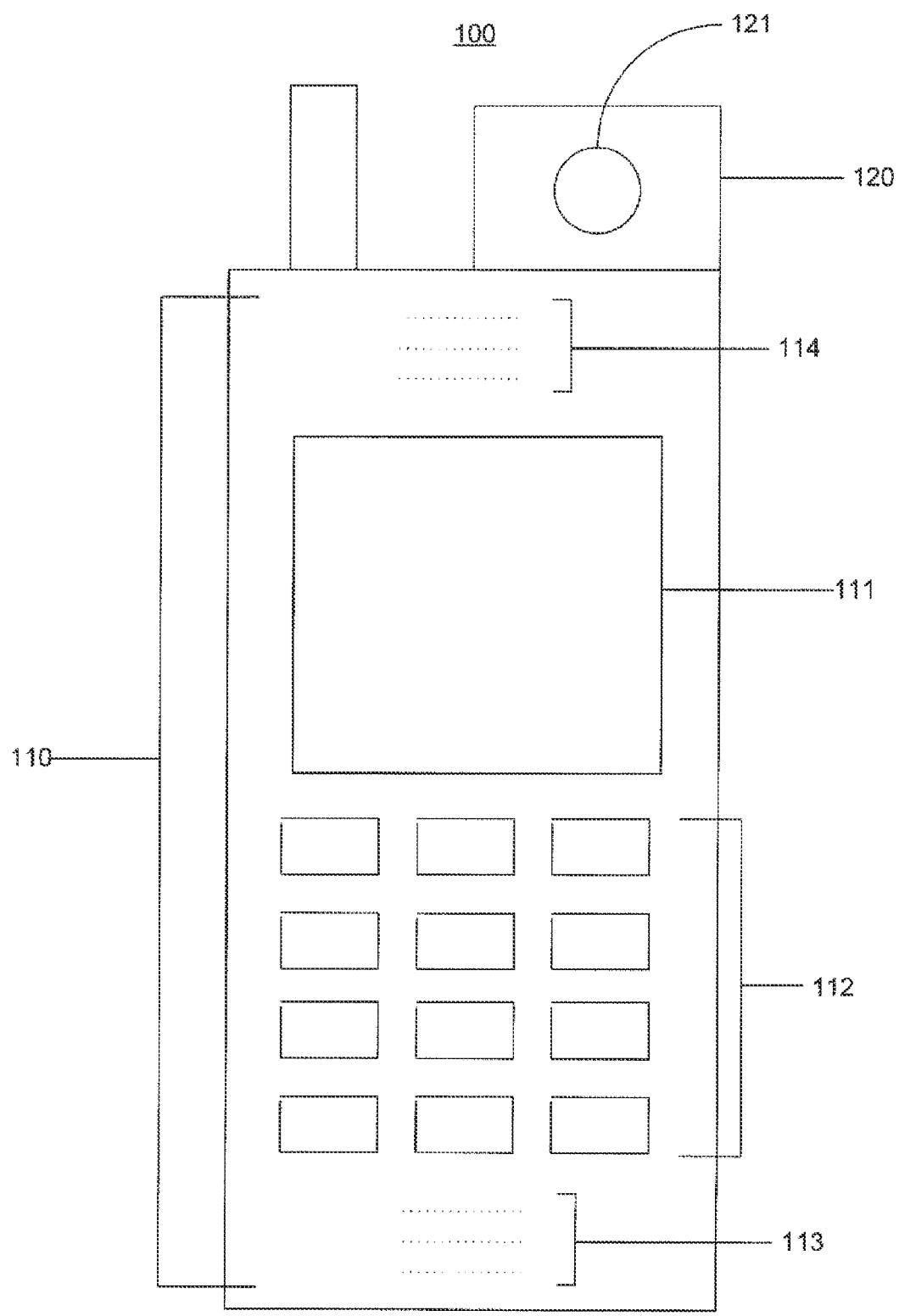
FIG. 1 illustrates an example of a camera phone configured to determine a description of motion and control a user interface based on the determined motion.

Referring to FIG. 1, a system is described in which the optical flow of a sequence of images from a camera embedded in a handheld entertainment device, such as a camera phone 100, is used to determine the motion of the handheld device as a means, for example, of controlling a game or application. The camera phone 100 includes a user interface 110 configured to allow a user to interact with the device. The user interface 110 includes, for example, a display interface 111, a keypad 112, a microphone 113, and a speaker 114. The display interface 111 provides a visual display to the user, which may indicate information regarding the status of the camera phone or provide a visual interface for an application, such as a game configured to execute on the camera phone. The keypad 112 includes a group of buttons or pressure activated switches that a user can activate to provide an input to the camera phone. The microphone 113 accepts an audible input from a user and may be configured to transmit the audible input to another device using the telephone system or determine a user input based on the user's audible input. The speaker 114 produces an audible output to a user and may be configured to produce an audible output of a communication over the telephone system or produce an audible output to indicate information regarding the status of the camera phone (e.g., produce a sound to indicate acceptance of a user input). A processor (not shown) is configured to accept input from each portion of the user interface 110, perform a function or operation based of the user input, and render a display on the display interface 111 and/or produce sound from the speaker 114 in response to the user input when appropriate.

The camera phone 100 also includes a camera 120. The camera 120 has a lens 121 for focusing an image and is capable of capturing a digital representation of the image focused by the lens 121. Although FIG. 1 depicts the camera 120 at the top of the camera phone 100 and facing the user when the user is viewing the display interface 111, the camera 120 may be located on the camera phone in a variety of positions and orientations. For example, the camera 120 may be located at the top of the camera phone 100 and facing away from the user when the user is viewing the display interface 111. The camera 120 may be configured to capture a series of images over time, as the camera phone 100 is moving. The processor (not shown may accept the series of images and perform processing on the series of images to determine a description of motion of the camera phone 100. Based on the determined motion, the processor may determine a user input to an application that corresponds to the determined motion of the camera phone 100. For example, if the processor determines that the user rotated the camera phone 100 to the left, the processor may determine that the user wishes to take a particular action and, if the processor determines that the user rotated the camera phone 100 to the right, the processor may determine the user does not wish to take a particular action. In another implementation, the processor may use the determined motion as a user input to a game executing on the camera phone 100. For example, rotating the camera phone 100 to the left may cause an object displayed in a game to move to the left and rotating the camera phone 100 to the right may cause an object displayed in a game to move to the right.

One technique the processor of the camera phone 100 may use to determine a description of motion of a camera based on images captured as the camera is moving is known as optical flow. Optical flow describes the apparent relative velocity of features within a sequence of images. The sequence of images may be acquired from a single camera, allowing optical flow to be used without special camera hardware or calibration. Traditionally, optical flow is used for applications such as time interpolation of image sequences (inserting frames in movies) and 3D object reconstruction research.

To determine the motion of the camera, the processor may identify and compare stationary features within a series images. As the camera moves, the position of a feature within an image changes in response to the motion. The velocity of a feature may be described as a flow vector, and the set of feature velocities is referred to as a flow field. The velocities are relative to the camera. Other works often use the terms motion vector and motion field, however use of the terms "motion vector" and "motion field" may imply (unnecessarily for the present purposes) that the velocity of a feature in the image sequence directly corresponds to the motion of the object, whereby the camera is assumed to be stationary.

Because optical flow is relative to the camera, motion of the camera will result in apparent velocities of features in the camera view. Features may be stationary, that is, not changing their physical position, such as a tree. Conversely, features may be dynamic or moving (e.g., a car). The apparent motion of stationary features in a series of images is used to estimate motion of the camera. The motion of the camera can be calculated from the apparent velocities of features in the camera view. Furthermore, a well-distributed sparse set of features is sufficient for estimating camera motion.

Although a variety of motion estimation techniques capable of determining a description of motion of a camera based on captured images may be used, existing optical flow systems are generally computationally expensive, and are, therefore, inappropriate for present-day consumer handheld devices. Consumer handheld devices include a general purpose processor capable of performing a wide range of types of calculations, however the number of calculations that can be performed for each video frame is limited.

Existing optical flow systems generally attempt to generate a dense flow field. Camera motion can be described in six degrees of freedom (e.g., translation along the X, Y, and Z axes and rotation about the X, Y, and Z axes). However, under the intended application, motion can be approximated with fewer degrees of freedom. In one implementation, approximation of camera motion may be achieved by assuming motion in a particular degree of freedom is negligible and ignoring motion in that degree of freedom. For example, camera motion may be approximated by describing camera rotation about the X-axis and the Y-axis while ignoring rotation about the Z-axis and translation along the X, Y, and Z axes. Therefore, although the processor may generate a dense flow field to estimate camera motion, a well-distributed sparse set of features is sufficient for estimating camera motion. A well-distributed sparse set features is discussed below, for example, with respect to FIG. 7.

Figure 3A:
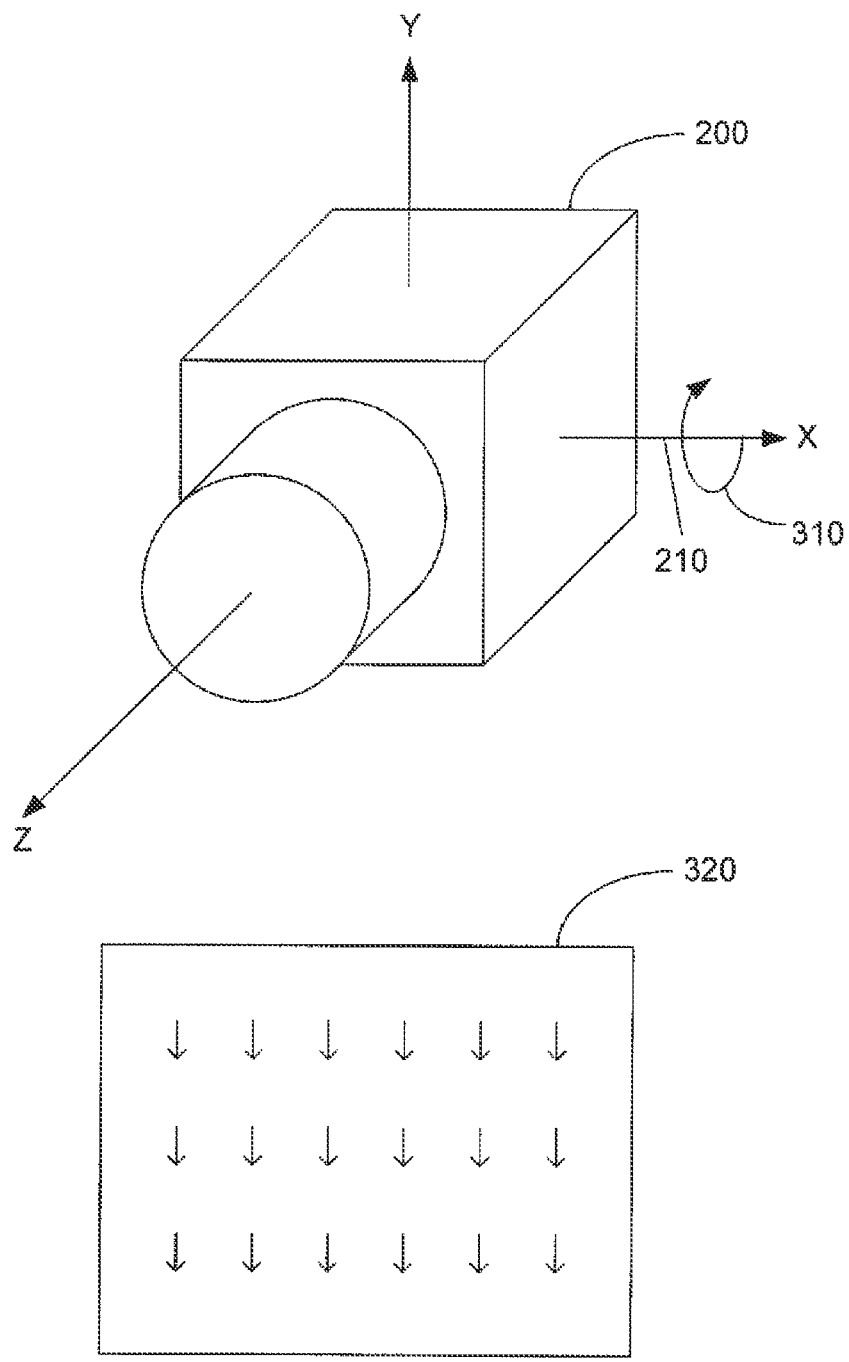
FIG. 3A illustrates an example of a camera and optical flow vectors resulting from rotation of the camera about the X-axis.
Figure 3B:
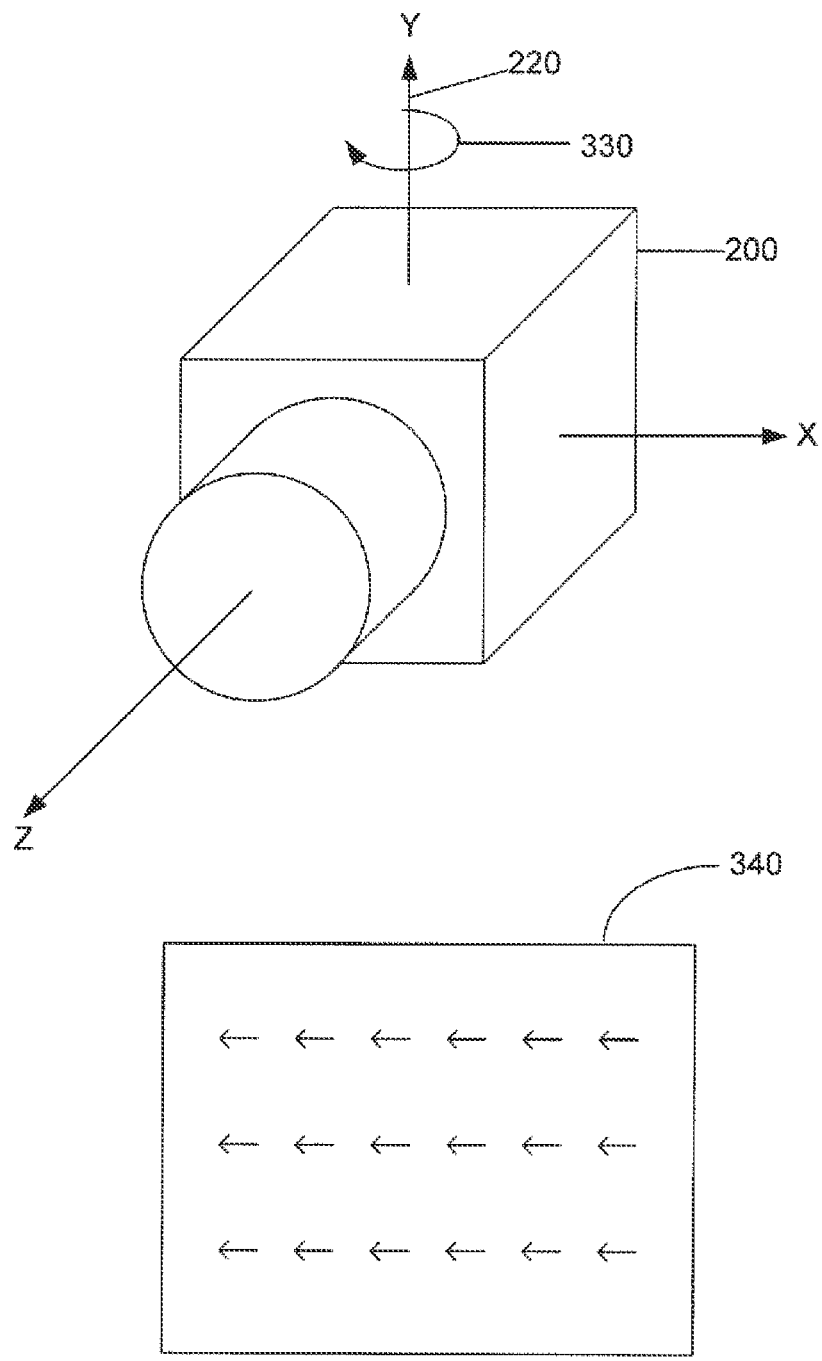
FIG. 3B illustrates an example of a camera and optical flow vectors resulting from rotation of the camera about the Y-axis.
Figure 3C:
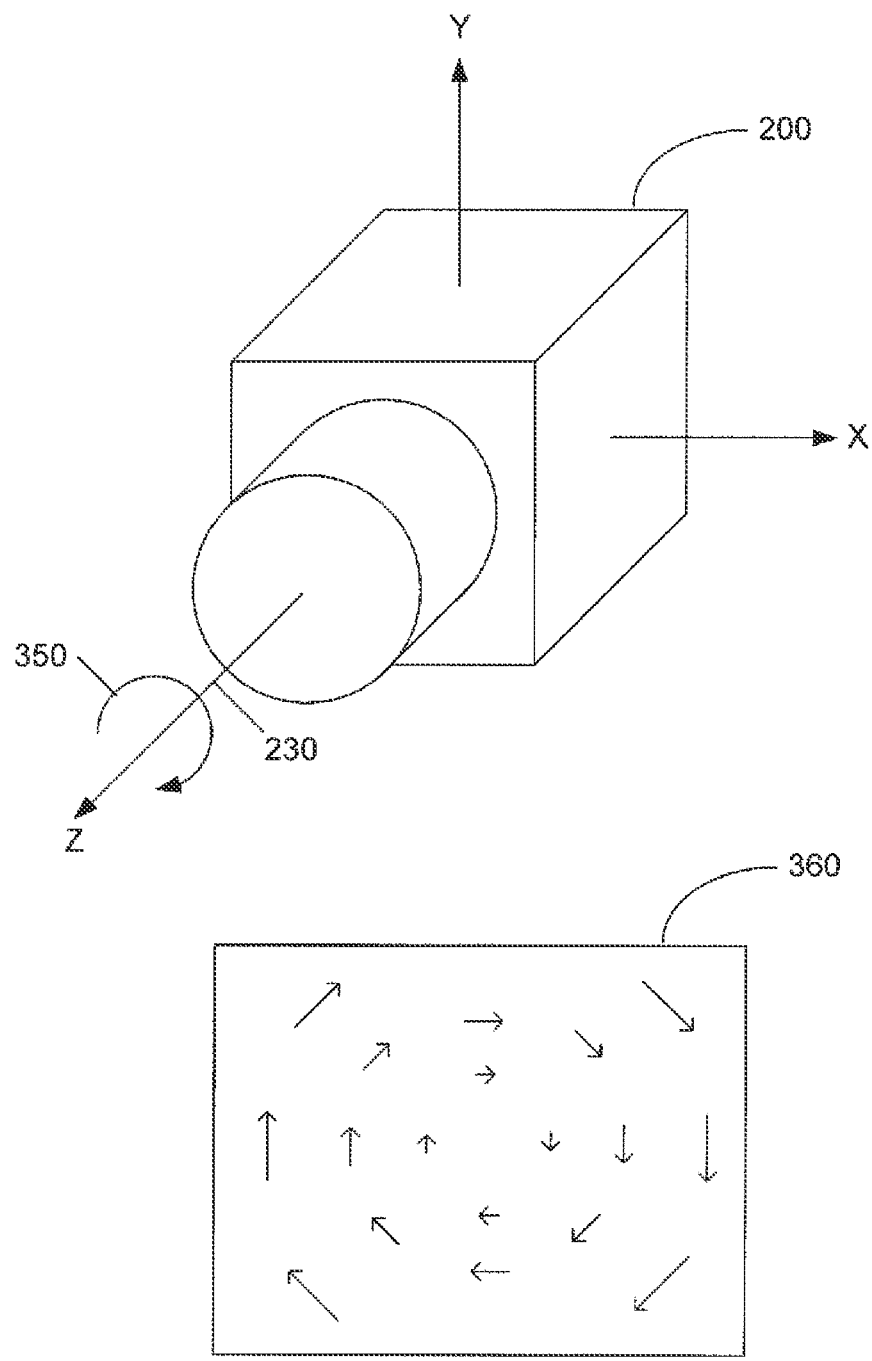
FIG. 3C illustrates an example of a camera and optical flow vectors resulting from rotation of the camera about the Z-axis.

When tracking features, rotation (panning and tilting) of the camera's field of view without translation will result in optical flow whereby the flow vectors are independent of the 3D scene geometry (depth). This is illustrated in FIGS. 3A-3C discussed below. In a stationary scene in which the camera is being rotated, no features will be occluded or exposed by other objects as the camera moves, and features will only appear or disappear as they enter or leave the camera's field of view. To illustrate, suppose a person wants to look behind an object to see what is behind it. The person must lean or move (e.g., a translation motion) to look around the object and cannot simply turn his or her eyes (e.g., a rotation motion) to look around the object.

Figure 2:
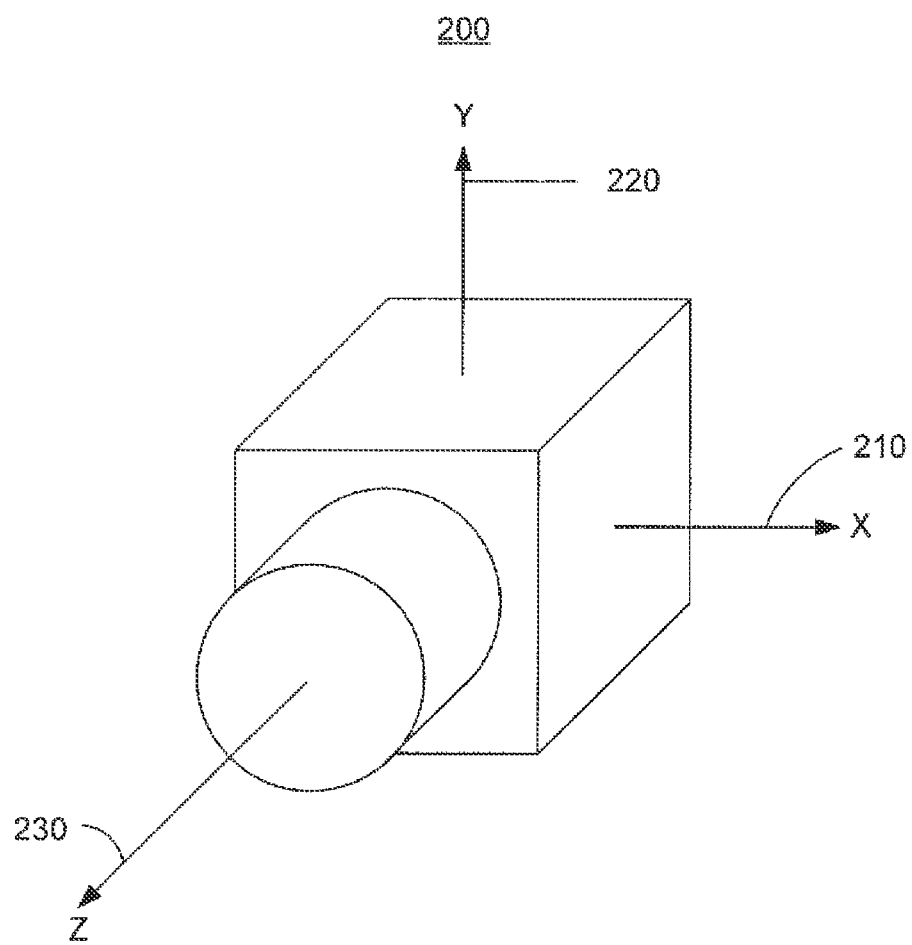
FIG. 2 illustrates an example of a camera and an axis system for defining motion of the camera.

FIGS. 2-4 illustrate examples of possible camera motions and the optical flow vectors and optical flow field that result from the indicated motions.

Referring to FIG. 2, a camera 200 capable of capturing a series of images is shown in relation to an axis system for defining motion of a camera. In particular, a camera's rotation is measured with respect to three degrees of freedom. For example, the rotation may be measured with respect to an X-axis 210, a Y-axis 220, and a Z-axis 230. Measurements of rotation about each axis may completely define the rotation of the camera. Descriptions of motion for a camera will be described with respect to this defined axis system. In the following examples, optical flow vectors will be determined based on the camera 200 looking down from above the page and imaging objects on the page.

Referring to FIG. 3A, camera 200 is shown as being rotated about the X-axis 210, as indicated by a vector 310. In a stationary scene, the flow vectors will tend to be parallel and of equal magnitude for a rotation about the X-axis 210. Optical flow vectors resulting from a rotation of the camera 200 about the X-axis 210 are shown in an optical flow field 320. As the camera 200 rotates about the X-axis 210 in the direction shown by vector 310, stationary objects captured in a series of images appear to be moving in the direction indicated by the optical flow vectors shown in the optical flow field 320. Specifically, as the camera 200 rotates about the X-axis 210 upwards toward the top of the page while the camera 200 captures a series of images, stationary objects present in the series of images appear closer to the bottom of the image in the images taken later in time and result in flow vectors pointing toward the bottom of the page. Based on the calculated optical flow field 320, a rotation about the X-axis 210 may be detected.

Referring to FIG. 3B, camera 200 is shown as being rotated about the Y-axis 220. In a stationary scene, the flow vectors will tend to be parallel and of equal magnitude for a rotation about the Y-axis 220. Optical flow vectors resulting from a rotation of the camera 200 about the Y-axis 220 are shown in an optical flow field 340. As the camera 200 rotates about the Y-axis 220 in the direction shown by a vector 330, stationary objects captured in a series of images appear to be moving in the direction indicated by the optical flow vectors shown in the optical flow field 340. Specifically, as the camera 200 rotates about the Y-axis 220 toward the right side of the page while the camera 200 captures a series of images, stationary objects present in the series of images appear to move from right to left. Thus, the stationary objects appear closer to the left side of the image in the images taken later in time and result in flow vectors pointing towards the left side of the page. Based on the calculated optical flow field 340, a rotation about the Y-axis 220 may be detected.

Referring to FIG. 3C, camera 200 is shown as being rotated about the Z-axis 230. In a stationary scene, the flow vectors will tend to be tangential to a circle about the midpoint of the camera view, with magnitude proportional to the radius, for a rotation about the Z-axis 230. Optical flow vectors resulting from a rotation of the camera 200 about the Z-axis 230 are shown in an optical flow field 360. As the camera 200 rotates about the Z-axis 230 in the counterclockwise, direction shown by a vector 350, stationary objects captured in a series of images appear to be moving in the clockwise direction indicated by the optical flow vectors shown in the optical flow field 360. Accordingly, a roughly circular optical flow field 360 of vectors may be achieved. Based on the calculated optical flow field 360, a rotation about the Z-axis 230 may be detected.

Figure 4A:
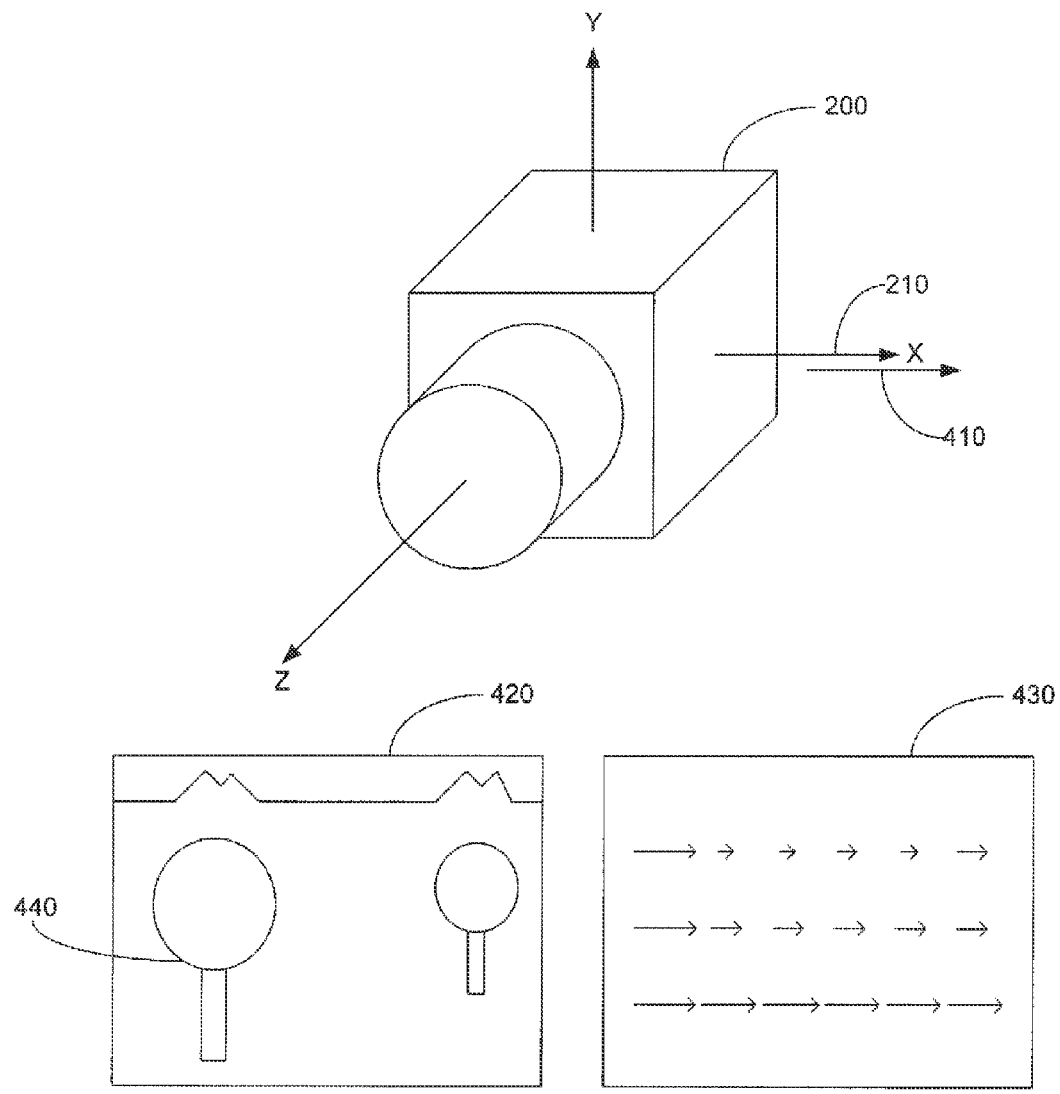
FIG. 4A illustrates an example of a camera and optical flow vectors resulting from a translation along the X-axis.

Referring to FIG. 4A, camera 200 is shown as being translated along the X-axis 210 in a direction shown by a vector 410. Translation of the camera's field of view will result in optical flow whereby the flow vectors are dependent on the 3D scene geometry (depth). In a stationary scene in which the camera is being translated, the magnitude of the flow vectors will be dependent upon the distance of the object from the camera 200, that is the depth, and features may be occluded or exposed by objects that are closer to the camera. Optical flow vectors resulting from a translation of the camera in the X-axis direction 410 when imaging a scene 420 are shown in an optical flow field 430. As the camera 200 translates to the left along the X-axis direction 410, stationary objects (e.g., the trees and mountain in scene 420) captured in a series of images appear to be moving to the right in the direction indicated by the optical flow vectors shown in the optical flow field 430. As shown by the difference in magnitude of the flow vectors present in optical flow field 430, objects closer to the camera 200 appear to move a greater distance than objects further from the camera 200. As a result, the length of flow vectors for a translation is dependent on the depth of the objects being imaged in relation to the camera 200. For example, because a tree 440 is the object closest to the camera, the flow vectors representing the tree 440 have the greatest magnitude. Based on the calculated optical flow field 430, a translation along the X-axis 210 may be detected.

Figure 4B:
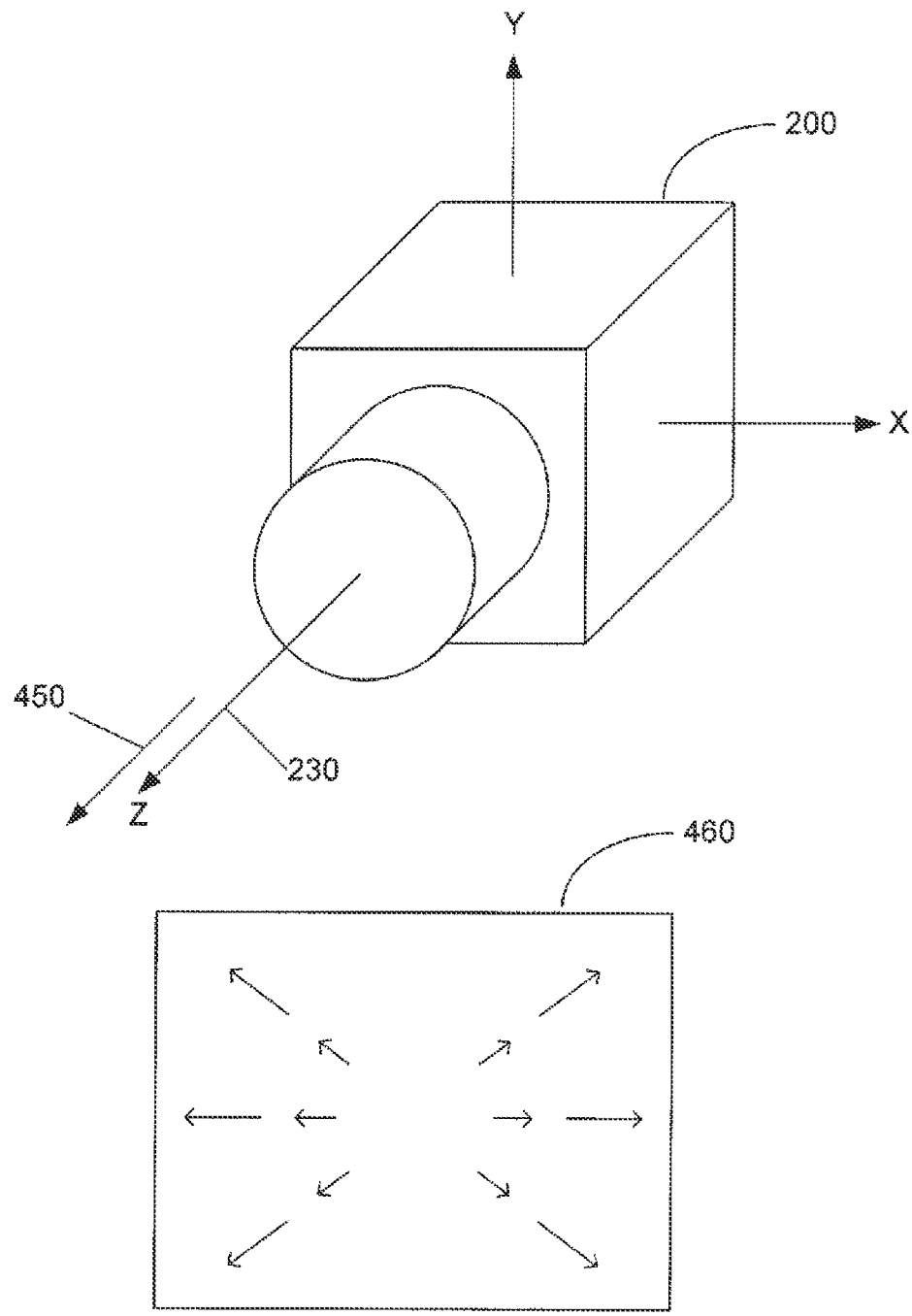
FIG. 4B illustrates an example of a camera and optical flow vectors resulting from a translation along the Z-axis.

Referring to FIG. 4B, camera 200 is shown as being translated along the Z-axis 230 in a direction shown by a vector 450. Optical flow vectors resulting from a translation of the camera in the Z-axis direction 450 are shown in an optical flow field 460. As the camera 200 translates along the Z-axis direction 450, stationary objects captured in a series of images appear to be moving in the direction indicated by the optical flow vectors shown in the optical flow field 460. Specifically, as the camera moves forward along the Z-axis direction 450 toward the objects being captured while the camera 200 captures a series of images, stationary objects present in the series of images appear to move outward along radial lines extending from the center of the images. Accordingly, optical flow field 460 of flow vectors extending radially outward from the center of the image may be achieved. Based on the calculated optical flow field 460, a translation along the Z-axis 230 may be detected.

Although not illustrated, translation of camera 200 along Y-axis 220 would produce an optical flow field analogous to that shown in FIG. 4A, except that the flow vectors would be parallel to the Y-axis 220.

Figure 5A:
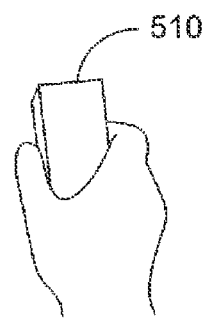
FIGS. 5A and 5B illustrate examples of a user holding a cellular phone that includes a camera on the underside of the cellular phone.
Figure 5B:
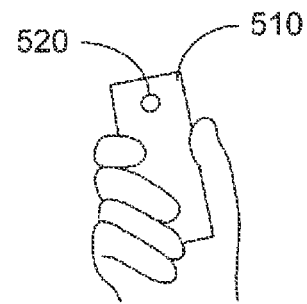
Figure 5C:
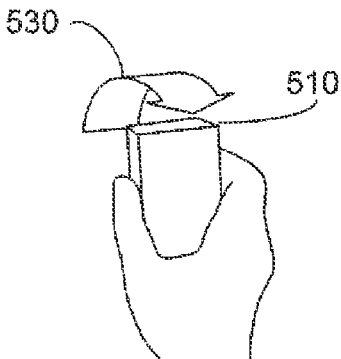
FIGS. 5C and 5D illustrate examples of the motion of a user's hand in rotating a cellular phone that includes a camera about the X-axis.
Figure 5D:
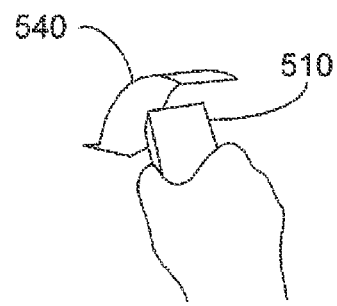

FIGS. 5A-5B illustrate examples of the motion a user may impart to a moving mobile camera using his or her hand. In particular, FIGS. 5A and 5B illustrate a cellular phone 510 that includes a camera 520 on the underside of the cellular phone 510. The user holding the cellular phone 510 may extend his or her wrist backward 530 (FIG. 5C) or forward 540 (FIG. 5D) to effect a rotation of the cellular phone 510 and camera 520 about the X-axis. The motion of the user extending his or her wrist backward 530 (FIG. 5C) is an example of user motion about the X-axis in a direction that may produce the optical flow field 320 shown in FIG. 3A.

Figure 5E:
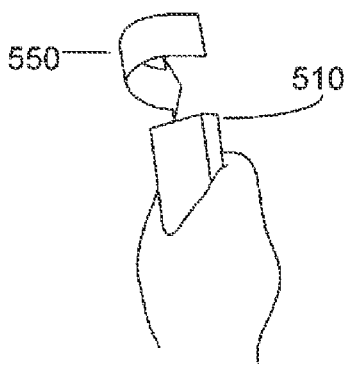
FIGS. 5E and 5F illustrate examples of the motion of a user's hand in rotating a cellular phone that includes a camera about the Y-axis.
Figure 5F:
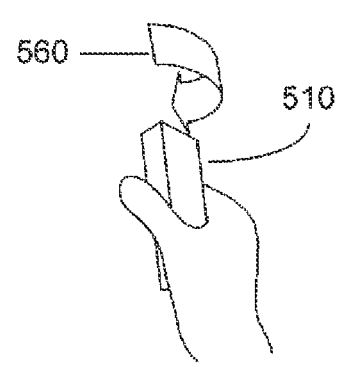

In addition, the user holding the cellular phone 510 may twist his or her wrist clockwise 550 (FIG. 5E) or counter-clockwise 560 (FIG. 5F) to effect a rotation of the cellular phone 510 and camera 520 about the Y-axis. The motion of the user twisting his or her wrist clockwise 550 (FIG. 5E) is an example of user motion about the Y-axis in a direction that may produce the optical flow field 340 shown in FIG. 3B. Employing, for example, the motions shown in FIGS. 5C-5F, a user may impart a detectable motion to the camera to produce a user input to control a user interface of an application.

Figure 6:
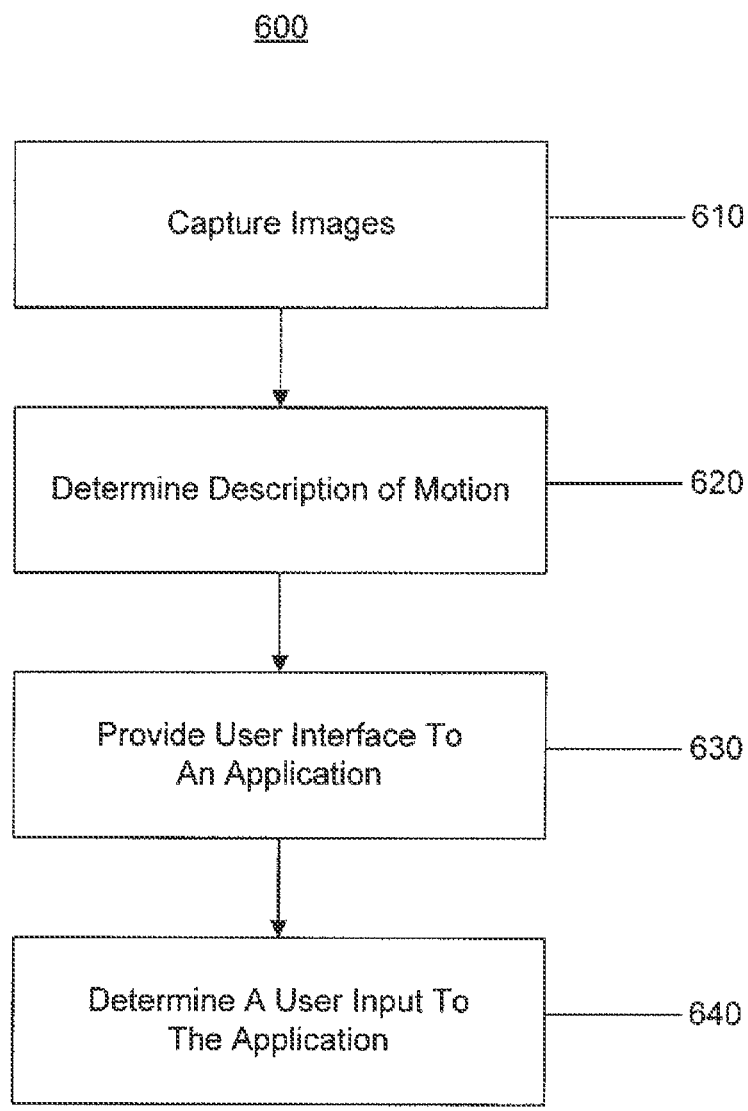
FIG. 6 is a flowchart of an example of a process for determining a description of motion of a device to determine a user input to an application.

FIG. 6 is a flowchart of an a process 600 for determining a description of motion of a device to determine a user input to an application. In one implementation, a processor on a handheld entertainment apparatus with a camera affixed (such as camera phone 100, or PDA or other mobile device equipped with a camera) may perform process 600, and measurement of the rotation of the camera's field of view may be used to control a game or application running on the handheld entertainment apparatus. The measurement of rotation may be used to provide an input that is analogous to a tilt sensor. Further, because both the direction and magnitude of tilt can be measured, "analog" control may be provided. Analog controls tend to provide finer control and are preferable to "digital" control for many styles of gameplay.

In implementing process 600 shown in FIG. 6, a moving mobile camera captures images (610). Capturing images (610) may include, for example, capturing a digital representation of a series of images over a period of time during motion of the camera.

A processor determines a description of motion of the camera based on the captured images (620). The processor, for example, may compare the most recently acquired image with images acquired earlier in time to determine the change in position of stationary features in the series of images to estimate the motion of the camera. The processor may utilize an optical flow process discussed above. Determining a description of motion 620 is discussed in more detail with respect to FIG. 7.

In addition, a user interface to an application is provided on an interface device (630). The user interface may be separate from the mobile camera (using, for example, wireless communication) or may be physically coupled to or integrated in a device that includes the mobile camera (e.g., display interface 111 integrated in camera phone 100). The user interface may include a visual display for an application, such as a game, with which a user may interact. The user interface may also include a speaker configured to produce sounds in response to a user input. For example, the user interface may include a speaker configured to produce a sound to indicate acceptance of a motion that triggers an action.

Based on the determined motion of the camera, a user input to the application is determined (640). The user input may be determined in an automated manner corresponding to the motion of the camera. In one implementation, an application may multiply the camera motion and position by a factor to adjust "sensitivity," where the factor may be pre-programmed or selected by the user. "Sensitivity" determines how much the user must tilt or move the device to effect a user input, such as a movement of a character in a virtual environment of a game. For example, a user input may be detected and determined only when the motion of the camera is large enough to meet the level of "sensitivity" (i.e. small insignificant motions may be ignored and not result in a determined user input). Where "sensitivity" is used, the real-world position will typically not be necessary and not be calculated. A real-world position refers to the position of the device in the physical world measured in units such as inches, centimeters, and degrees (e.g., the device rotated 25 degrees and moved 30 centimeters east). A virtual-world position refers to a position in a virtual environment, such as a game, that includes virtual characters and objects (e.g., the virtual character moved three blocks in the virtual environment). When using "sensitivity," the movement of the camera determined, for example, in pixels is compared to or multiplied by a "sensitivity" factor to generate an input or movement in a virtual environment. Because the input or movement relates to a virtual environment, the real-world position of the camera is not needed.

In one example, an application may use the camera orientation to replicate a tilt sensor function. The tilt sensor function may be used in controlling a ball in a game, including simulating the tilt of a plane on which the ball rolls. In another example, an application may use the camera orientation to replicate a steering function. The steering function may be used in controlling a vehicle (e.g., automobile, motorcycle, airplane, watercraft, surfboard, snowboard, skateboard, hover board, space craft). The steering function may include control of one or more of steering-direction, pitch, yaw, or roll. In yet another example, an application may use the camera orientation to replicate a targeting (aiming) function. The targeting or aiming function may be used in controlling a virtual weapon (e.g., aiming a rifle). The targeting (aiming) function typically includes two degrees of freedom. In addition, an application may use a sub-set of features that have been classified as moving objects, as described below. This may be used to augment a targeting (aiming) application (e.g., a moving object or feature may be designated as a target and the objective of the game may be to aim the device so that the moving object or feature is located in the center of the screen within displayed crosshairs). An application, for instance, may also use the camera orientation to replicate an absolute positioning function. The absolute positioning function may be used in a navigational application (e.g., tracking a user's position in a real world environment to help the user navigate through the environment, such as a store or shopping mall) or maze game (e.g., a user walks through a virtual maze by walking around in the real world). The motions required may be those performed by the hands, or may require that the user move about in an environment.

In another implementation, an application may use the camera orientation to control an animated character (e.g., a bobblehead or a marionette). The instantaneous magnitude and direction of tilt may be translated into movements of the character. Components of the articulated character may be given simulated mass, whereby the amplitude of movement of a component, given a detected motion, is inversely proportional to its mass. Components of the articulated character may further be interconnected by simulated springs, with a predefined resonate frequency.

In addition, an application may use the camera orientation to control particles in a particle simulation application (e.g., a snow-globe or sand-art). The instantaneous magnitude and direction of tilt may determine the number of particles and/or their kinetic energy. Particles may be attracted by simulated gravity, whereby particles settle within the virtual environment. The virtual environment may include an image or objects, and particles may settle on top of objects. In a version of this application, the particles represent snow. Optionally, the application may be distributed in the form of an electronic greeting card (e.g., a Christmas card). In a version of this application, the particles are displayed in a selection of colors (e.g., sand-art). In this application, the colored particles may settle in patterns.

Figure 7:
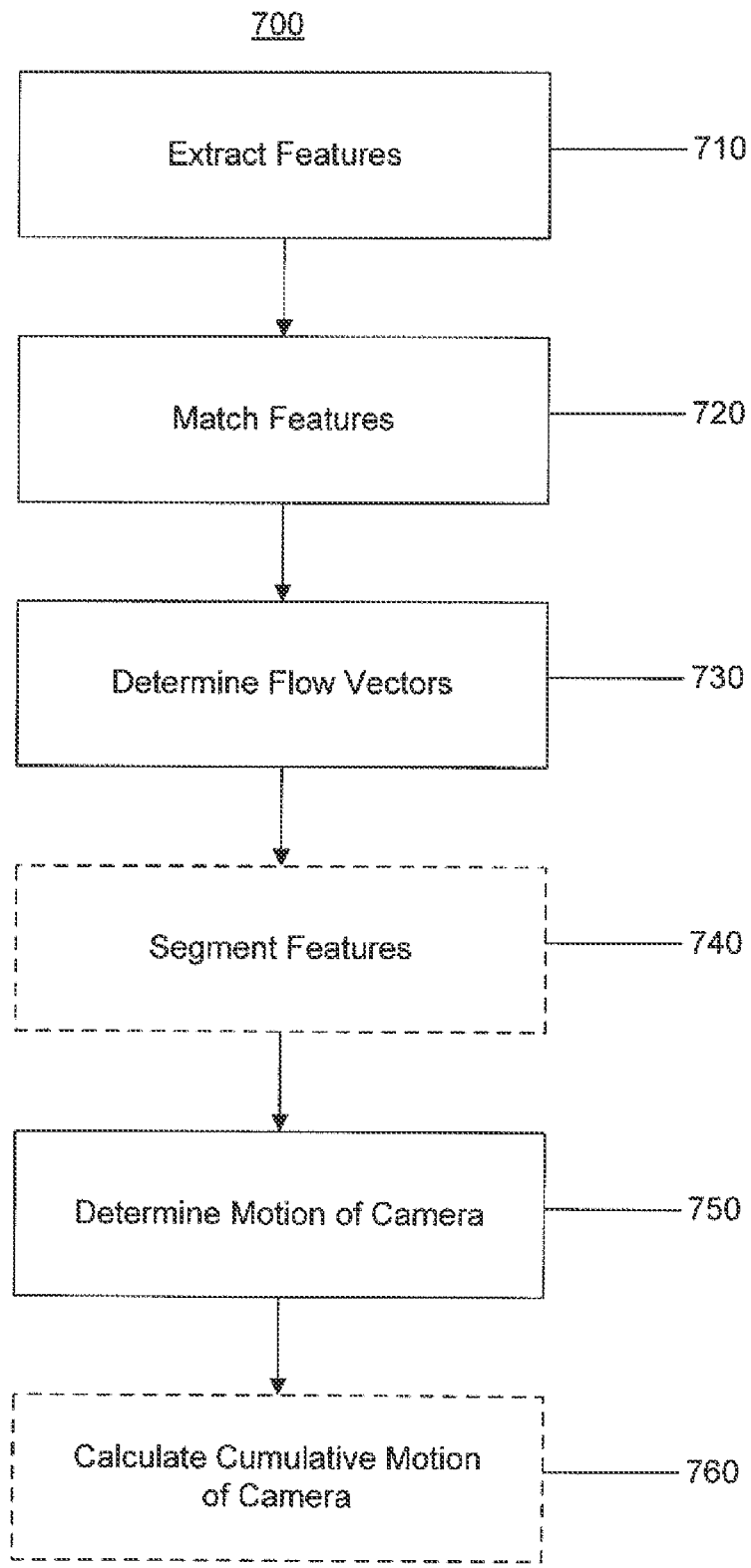
FIG. 7 is a flowchart of an example of a process for determining a description of motion of a moving camera.

FIG. 7 is a flowchart of a process 700 of using optical flow to determine a description of motion of a moving camera. Although a dense flow field algorithm may be used, camera motion can be described in six degrees of freedom, and under the intended application approximated with fewer degrees of freedom. Therefore, a well-distributed sparse set of features is sufficient for detecting or estimating camera motion in varying degrees of freedom and may be used to reduce the processing load. With the decreased processing load, images may be captured and processed in real time in certain implementations.

In one implementation, a well-distributed sparse set of features is sufficient for estimating camera motion in six degrees of freedom. In sparse optical flow, a flow vector may be generated only for visually distinctive features within the image. These features may be scattered throughout the image. In a well-distributed set of features, the features are distributed throughout the entire image such that there is at least one feature within each region of the image (as opposed to, for example, all the features appearing in a clump in one corner of the image). Therefore, a dense flow field is not required to describe the motion in all regions of the image, a sparse set can do the same if the features are well-distributed.

In sparse optical flow, a well-distributed set of features may be needed. For example, compare rotation about the Y-axis (FIG. 3B) to translation along the X-axis (FIG. 4A). If the features were poorly distributed, for example all along the bottom of the image, all the flow vectors would have similar orientation and length, and translation along the X-axis would be indistinguishable from rotation about the Y-axis.

Some implementations of the invention approximate motion with fewer than six degrees of freedom, in which case a particular degree of freedom is assumed to be negligible and is ignored. The need for well-distributed features is lessened as the degrees of freedom are reduced. For example, in one implementation the camera motion may be approximated by describing camera rotation about the X-axis and the Y-axis while ignoring rotation about the Z-axis and translation along the X, Y, and Z axes. With this assumption, motion of the camera in the preceding example in which all the features are along the bottom of the image can be assumed to be the effect of rotation about the Y-axis because translation along the X-axis is assumed to be insignificant.

Process 700 includes extracting features (710). In analyzing a series of images captured from a moving mobile camera, a feature extraction process is applied to each image that is acquired by the camera. The feature extraction process need only extract a sparse set of features from an arbitrary image. The features sought after typically include corners and edges. Corners and edges are commonly found in many environments where a device will typically be operated. Corners and edges are fairly resilient to dynamic light levels, which may be important if the device is operated outdoors. Furthermore, corner and edge features are relatively computationally inexpensive to detect in an image. Methods of exacting corners and edges are well known.

After extracting features, process 700 compares images to match features common to more than one image (720). For example, a flow-field calculating process matches features of the current camera image to corresponding features of a previous camera image. To match features, each feature of the current camera image is compared to a subset of the features of a previous camera frame. The sub-set is selected by proximity and feature characteristics (e.g., orientation and contrast of the corner). The small number of features that need to be compared in particular implementations helps minimize the computational requirements of the device.

In one implementation, the current image position of features of the previous camera image is predicted using prior flow fields (except on the first frame, where no prior flow fields are available). A one-to-one match is selected based on a score generated by the distance to the predicted position, the feature characteristic similarity, and the uniqueness of the match with respect to the set of all possible matches. The score is a scalar value and represents a measure of confidence. To assure a one-to-one match, the possible pairings are ranked based on its score minus a penalty based on other possible match scores involving either of the pair's features. Matches with sufficient score (confidence) are added to the flow field. The score (confidence) is recorded with the flow vector for later use.

In other implementations, to reduce computational requirements, the operation of matching features may include first analyzing blocks located near the feature or attempting to match features first at a lower resolution and continuing to increase the resolution until a match is find or the highest resolution image has been compared. For example, a pyramid approach in which the image is decimated may be applied. Decimation generates a tower resolution version of the image (referred to as a level of the pyramid) by, for example, dividing the image into blocks and generating one pixel value representing each block (e.g., by averaging the pixels within the block). Processing requirements may be reduced because the lower resolution version of the image has fewer pixels to analyze and smaller regions to search. Once a result has been found at a low resolution, the image may be analyzed at a higher resolution, using the result found at the low resolution to constrain the search. For example, if a feature match is found in one or more particular low resolution regions, then those particular low resolution regions may be searched for the feature at a higher resolution.

After matching features, process 700 determines a flow vector for each feature (730). One implementation determines the flow vector by calculating the displacement of the position of a feature in the current camera image relative to its position in a previous camera image. The set of flow vectors forms the flow field. Each flow vector may include a magnitude and a direction. The matched pairs produce an overall path of a feature's position between the two associated camera images. The path is optionally stored, so that the optical flow (and therefore camera motion) can be calculated across longer time spans.

Because the environment cannot be guaranteed to be static, and moving features may result in an inaccurate estimation of motion, features may optionally be segmented (740). The dashed box of operation 740 in FIG. 7 indicates that operation 740 is optional. In one implementation, features are segmented into "sets" or "clusters" to generate a set of flow vectors associated with the static elements of the environment (i.e. the background). For example, if a bird is flying across an image in the same direction as the motion of the camera, the feature representing the bird may not show a displacement in as great a magnitude as stationary features or may show a displacement in the opposite direction if the bird is moving faster than the camera. Thus, segmenting the feature representing the bird and focusing on the stationary features may allow for a more accurate determination of motion of the camera.

In one example of segmenting, it is assumed that the static parts of the environment compose a greater area than any single dynamic (moving) part. Given this assumption, the most significant set of features is associated with the static elements of the environment, where the measurement of "most significant" includes the area covered by the set, not only the feature count, since features are not evenly distributed. Camera rotations are estimated using this set of features. A feature may be classified and tagged to signify whether it is likely to be a part of the static background or a moving object. That tag may be used as a hint in updating the feature's classification during later frames.

In another example, given an assumption that rotation about the Z-axis is insignificant (that is, rotation is limited to that about the X-axis and Y-axis) and translation along the X, Y, and Z axes is insignificant, flow vectors associated with the static elements of the environment (i.e. the background) will tend to have similar direction and magnitude. For example, as shown in FIGS. 3A and 3B, rotation about only the X-axis and Y-axis will result in flow vectors of static features that are approximately parallel and of similar magnitude. Moving features may be segmented from static features by detecting features that have flow vectors that are not sufficiently parallel to or close enough in magnitude to the flow vectors of static features (e.g., features determined to be static features). For example, a range of acceptable orientations (e.g., plus and minus five degrees from the orientation of a flow vector of a static feature) and a range of acceptable magnitudes (e.g., plus and minus five pixels from the magnitude of a flow vector of a static feature) may be calculated based on, for example, the determined orientation and magnitude of flow vectors of static features. If the orientation of a flow vector for a feature does not fall within the range of acceptable orientations or does not fall within the range of acceptable magnitudes, the feature may be segmented as a moving feature.

A preferred method, for use with a system of limited computational power, of segmenting the features into moving and static features is to select the most significant set of features using similarity in the direction and magnitude of their flow vectors. In this implementation, the most significant set of features is assumed to be a static background because the static background is typically larger than any one moving object. In other implementations, the most significant set of features may be assumed to be a known real-world reference object, such as a user's face in implementations in which the camera is oriented to face the user. Regardless of the assumption used, the most significant set of features may be determined by selecting the set of features with flow vectors that are parallel and of equal magnitude and spans the largest area within the image and/or has the largest count of features. Once the most significant set of features has been determined, moving objects may be segmented by rejecting features that have flow vectors that are not parallel to or of equal magnitude to the flow vectors of the most significant set of features. Estimation of additional degrees of freedom of camera motion (e.g., rotation about the Z-axis) is optional, and whether or not additional degrees of freedom are estimated may depend upon the available computational power of a handheld device.

Process 700 determines the motion of the camera (750). The motion of the camera may be determined using an optical flow field comprising optical flow vectors for each feature matched in a series of images and not segmented out. The motion of the camera may be calculated from the apparent velocities of features in the camera view represented by optical flow vectors. The magnitude and direction of the flow vectors for stationary features are related to the motion of the camera and may be used to estimate the motion of the camera.

For example, in a static scene, the rotation of the camera can be approximated by:

$$Vxi=Mx+Mz*Ri*\cos(Thetai)$$

$$Vyi=My+Mz*Ri*\sin(Thetai)$$

where

Vxi and Vyi represent the components of a flow vector of feature i

Mx, My, Mz represent camera rotations

Ri and Thetai represent a feature's position in the image in polar coordinates, and are determined from measurements The unknowns, Mx, My, Mz, can be estimated given a small number of sufficiently distributed features. The determined rotation (i.e. Vxi and Vyi) can be used directly to control an application, or can be converted to real-world units (degrees) given knowledge of the camera and lens characteristics.

In another implementation, rotation about the Z-axis and translation along the X, Y, and Z axes are assumed to be insignificant because the user typically does not rotate the camera about the Z-axis and the user is typically stationary. In this implementation, the camera rotations about the X-axis and Y-axis in a static scene can simply be estimated as the average of the flow vectors of all features. Because rotation about only the X-axis and Y-axis will result in flow vectors that are approximately parallel and of similar magnitude, the average of all flow vectors will be representative of a comparison of all flow vectors. In one example, the camera rotations about the X-axis and Y-axis in a static scene may be estimated as a weighted average of the flow vectors of all features. In a weighted average, the influence of each flow vector is multiplied by a confidence score. As a result, flow vectors that have high confidence (e.g., a good match) have a greater effect on the result than flow vectors that have a low confidence (e.g., a poor or suspicious match).

Process 700 optionally calculates cumulative motion of the camera (760). The dashed box of operation 760 in FIG. 7 indicates that the operation is optional. The cumulative motion may be calculated by tracking the determined motion of the camera. The cumulative motion of a sequence of camera images may be calculated to determine the device's position relative to an initial position. However, errors may compound relatively quickly from image to image.

To help reduce compounding errors, in calculating the flow field, the overall path of features may be stored. Therefore, the camera motion technique above could be applied to overall motion vectors, representing the displacement of a feature relative to the initial position. This may be particularly useful when the motion of the camera is limited so that a sub-set of features remains in the camera's field of view throughout tracking. For example, a tip of a pencil may be a feature in an image. As the camera moves over an area in which the tip of the pencil remains in the image, if the original position of the feature representing the tip of the pencil is stored, the cumulative motion of the camera may be calculated by comparing the current position of the feature representing the tip of the pencil with the original position of the feature representing the tip of the pencil. Because each path typically lasts for many camera frames, the accumulation of error will be slower than simply calculating the cumulative motion between frames.

Given all features detected since the initial image, the set of overall feature paths is not guaranteed to include a path spanning the full duration of tracking. For example, as suggested above, an object (such as the pencil tip) may pass out of the camera's field of view. However, the set of overall feature paths will likely include separate, but related, paths with overlapping start (first detected/enter camera view) and stop (last detected/exit camera view) times. The combination of the overlapping (in time) paths cart be used to cumulatively position features with respect to an initial position.

For example, a tip of a pencil may be a feature in an image, but the eraser of the pencil may not be present in the image. As the camera moves, the feature representing the tip of the pencil moves throughout the image and is tracked. In a later image, the camera may have moved in such a way that the eraser of the pencil has come into view and both the tip of the pencil and the eraser of the pencil are features tracked within the image. With further motion, the tip of the pencil may leave the image, but the feature representing the eraser of the pencil may still be present and tracked. Because the tip of the pencil and the eraser of the pencil were features in an image at the same time, the processor can calculate the relative position of the eraser of the pencil with respect to the tip of the pencil. Thus, using (1) the current position of the feature representing the eraser of the pencil, (2) the relative position of the eraser of the pencil with respect to the tip of the pencil, and (3) the stored path of the tip of the pencil before it left the camera view, the processor may determine the full path of the eraser. The full path of the eraser may than be used by the processor to track the cumulative motion of the camera and ascertain the initial position of the camera. This technique may be repeated with additional features to continue tracking the cumulative motion of the camera when the eraser of the pencil leaves the image. Using such related but separate feature paths may slow the accumulation of error even more than using individual feature paths.

Using the process 700, the following, for example, may be calculated: the camera motion, the camera position and/or orientation relative to an initial position and/or orientation, each to between two and six (inclusive) degrees of freedom. Estimating camera motion in less six degrees of freedom assumes that motion in one or more of the six degrees of freedom is fixed. For example, two degrees of freedom (rotation about the X-axis and Y-axis) may be appropriate if the user is expected to stand or sit in one position and not rotate the device about the Z-axis, three degrees of freedom (rotation about all three axes) may be appropriate if the user is expected to stand or sit in one position, and six degrees of freedom (rotation and translation about all three axes) may be appropriate if the user is expected to walk around. An application may reset the initial position for cumulative position calculation at any time, or at the start, e.g., of a session, game, level, or upon user request.

Although these are calculated in image-dependent units, they can be converted to real-world units (i.e. degrees) given knowledge of the camera lens. Image dependent units may be in terms of pixels associated with the camera image and real-world units may be in degrees (for rotation), and inches or centimeters (for translation). In one implementation of converting image-dependent units to real-world units, the orientation is simply multiplied by a factor representing the field of view (i.e. degrees) over the image size (i.e. pixels).

Figure 8A:
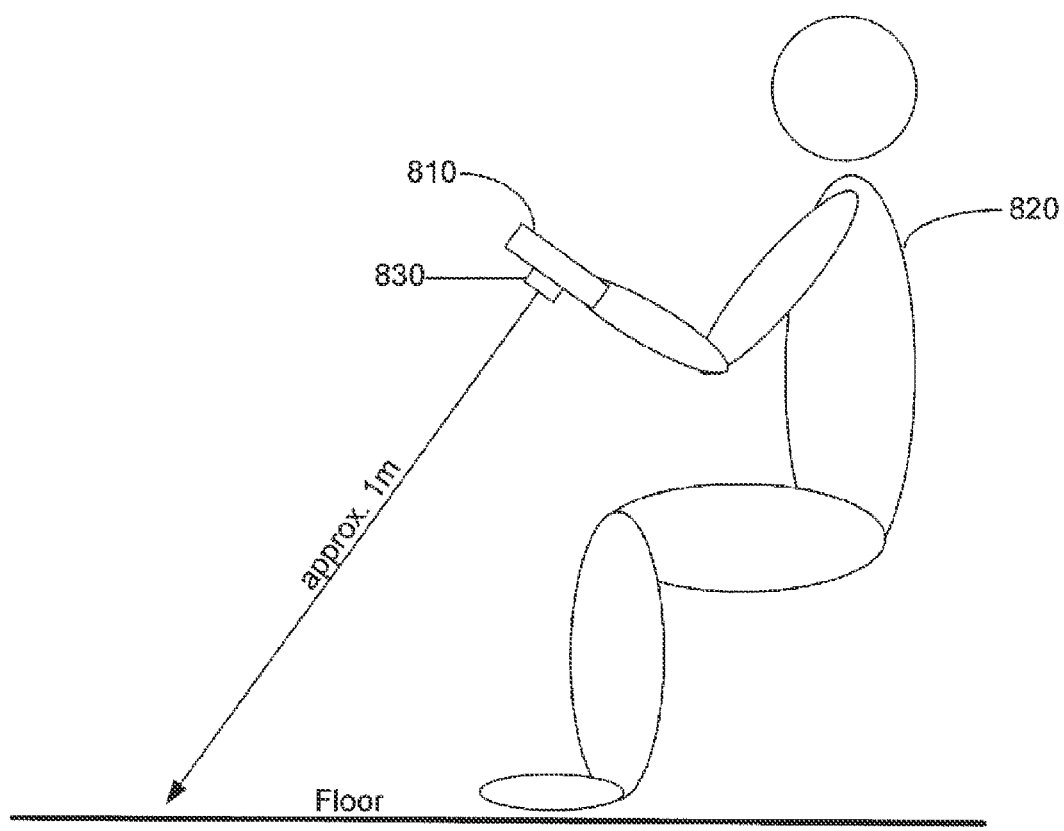
FIG. 8A illustrates an example of a user holding a camera-equipped handheld device in a seated position.
Figure 8B:
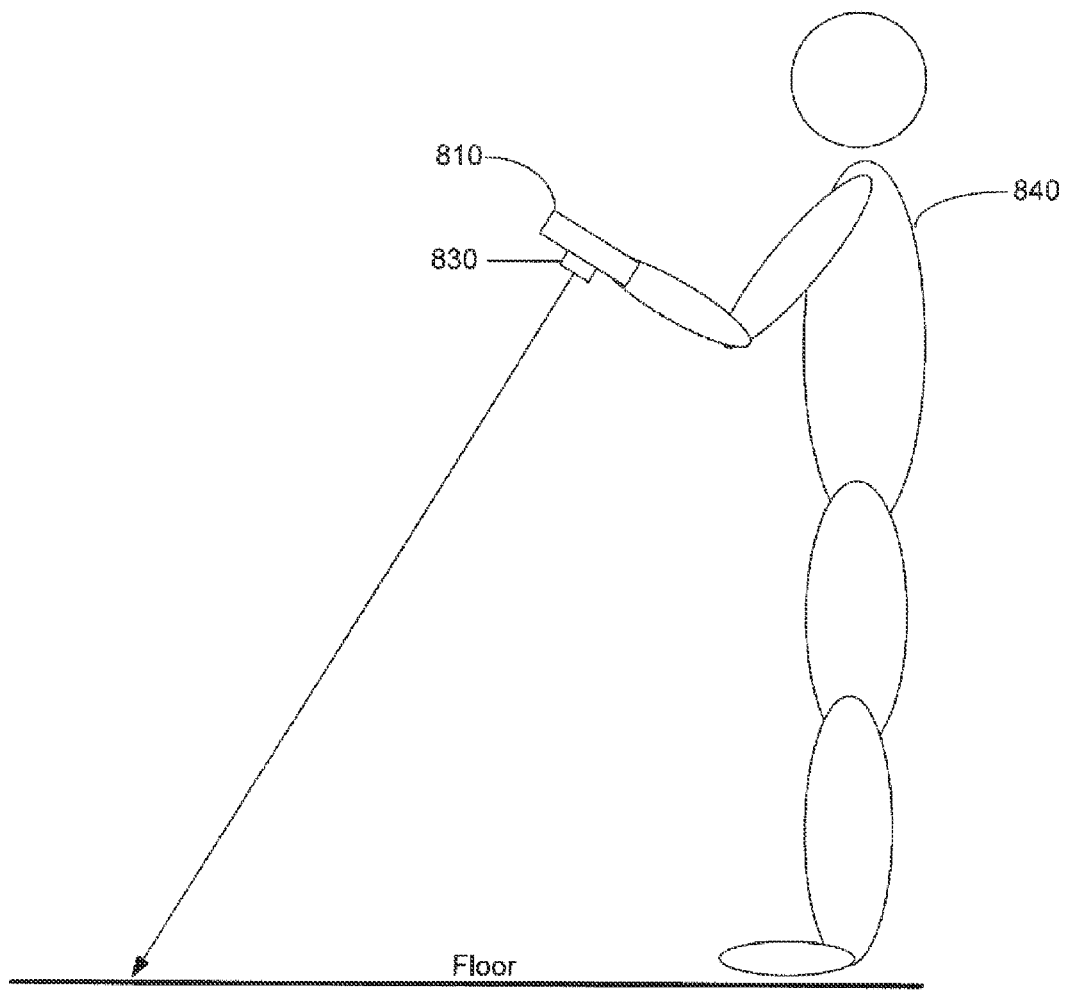
FIG. 8B illustrates an example of a user holding a camera-equipped handheld device in a standing position.
Figure 8C:
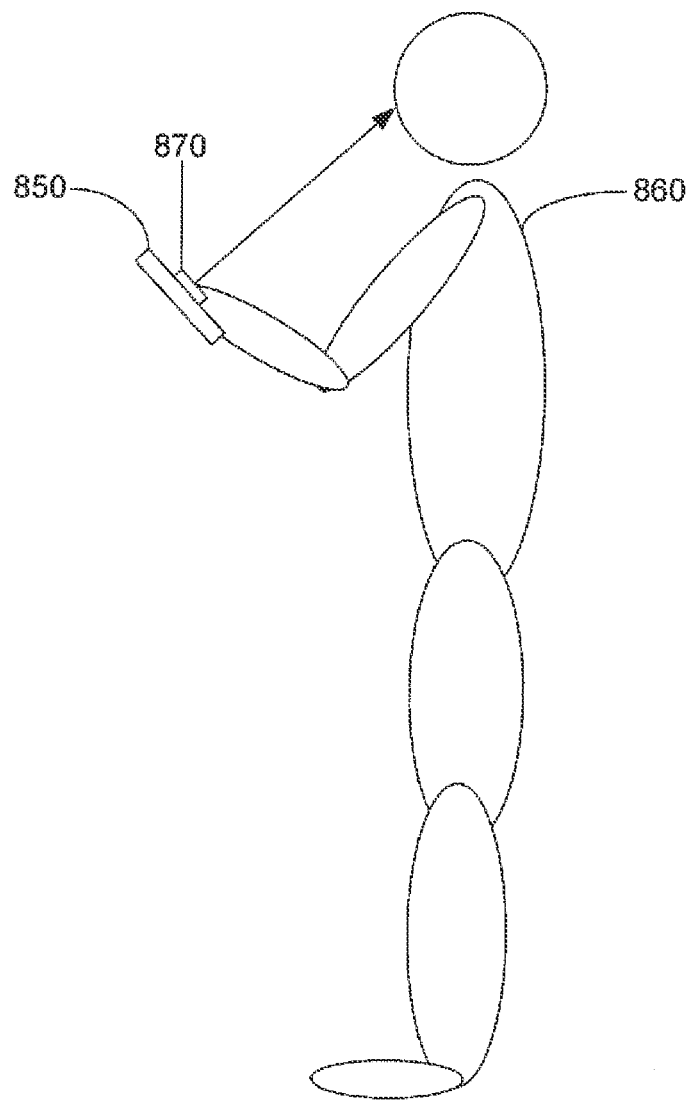
FIG. 8C illustrates an example of a user holding a camera-equipped handheld device in a standing position where the camera is pointed at the user.

FIGS. 8A-8C illustrate a user operating a camera-equipped handheld device 810 including a processor (not shown) configured, for example, to execute process 600 shown in FIG. 6 and process 700 shown in FIG. 7. The processor may be configured to execute an application with a display interface, such as a game.

Referring to FIG. 8A, device 810 is held by a seated user 820. For a camera affixed to a handheld entertainment apparatus (such as a camera phone), the camera's motion cannot be guaranteed to be purely rotational without translation. However, if objects in the scene are sufficiently far away from the camera, the effect of translation upon optical flow will be insignificant for certain applications because rotation will have a greater influence on the magnitude of a feature's flow vector than translation. In the illustrated example, a camera 830 of device 810 faces the floor, at a distance of approximately 1 m from the camera. In this scenario, the magnitude of the optical flow velocity that results from a camera rotation of 1 degree may be similar to a camera translation of 17 cm. A user in this scenario, intentionally tilting the camera phone, is unlikely to translate the phone greater than a few centimeters. Therefore, for the precision needed to control a game by rotating a device, the effects of translation can be ignored and optical flow can be assumed to be a result of pure rotation because a user would have to translate the device an unusually large distance to generate a noticeable error. Accordingly, the user 820 may provide a user input to an application executing on the camera equipped handheld device 810 by rotating the device.

Referring to FIG. 8B, device 810 is held by a standing user 840. In this example, the user 840 is standing relatively stationary with the camera 830 of device 810 facing the floor. Similar to a seated user, the distance to the floor is sufficiently far away that translation of the camera may be ignored and the user 840 may provide a user input to an application by rotating the camera-equipped handheld device 810.

Referring to FIG. 8C, a camera-equipped handheld device 850 is held by a standing user 860. In this example, a camera 870 of the camera-equipped handheld device 850 is facing the user's face. When the camera 870 is directed towards the user's face, and the face makes up a significant portion of the camera image, then the rotational measurements will be relative to the user 860, allowing the user 860 to operate the camera-equipped handheld device 850 while walking or otherwise moving around. This is because the face of the user will not be moving relative to the camera equipped handheld device 850 as the user 860 moves. Because the face of the user becomes the most significant object as opposed to the static background, the motion of the camera-equipped handheld device 850 is measured relative to the user 860. Therefore, the walking motion of the user 860 is not detected as motion of the device and does not affect the detection of a user input.

Determining a user input to control a user interface of an application, such as a game, has been one application described. However, other applications may be realized. In particular, applications may control other aspects or features of the device to which the camera is physically coupled. For example, a security application to prevent theft may be utilized whereby an alarm signal of the device is activated when motion of the device is detected and the alarm has not been deactivated. In addition, a volume control application may be realized whereby the volume of a camera phone may be increased when the user tilts the phone away from his or her ear. Processes 600 and 700, as well as various other of the implementations, features, and techniques described herein, may be implemented largely in software by an operating system running on a device. The software interacts with data from a camera, and with a display device such as a computer display, a television, or an LCD integrated in a device. Firmware and hardware may be used in conjunction with, or in lieu of software.

As is evident from the breadth of the disclosure, implementations, features, and techniques described herein, as well as variations or combinations of them, may be implemented, for example, in an operating system or in a stand-alone application or utility, running on one or more of a variety of devices.

Cell phones, personal digital assistants ("PDAs"), and other portable devices provide numerous implementations because the size of a user interface is typically limited, and controlling a user interface with such a device is typically difficult. For example, implementations may also include Blackberry devices, electronic organizers, iPod devices or other portable music players, beepers or other communication devices, and handheld or portable electronic devices for gaming, communications, and/or data organization.

Implementations may include one or more devices configured to perform one or more processes. A device may include, for example, discrete or integrated hardware, firmware, and software. A device may include, for example, a processor, which refers to processing devices in general, including, for example, a microprocessor, an integrated circuit, a programmable logic device, and a device containing a software application.

Implementations also may be embodied in a device that includes one or more computer readable media having instructions for carrying out one or more processes. The computer readable medium may include, for example, a storage device such as, for example, a hard disk, a compact diskette, a random access memory ("RAM"), and a read-only memory ("ROM"). A computer readable medium also may include, for example, formatted electromagnetic waves encoding or transmitting instructions. Instructions may be, for example, in hardware, firmware, software, and in an electromagnetic wave. Instructions may be found in, for example, an operating system, a separate application, or a combination of the two. A processor may be, for example, both a device configured to carry out a process and a device including computer readable media having instructions for carrying out a process.

Implementations also may be embodied in a software object. Such an object may be accessed by, or incorporated in, a variety of applications.

A number of implementations have been described. Nevertheless, it will be understood that various modifications may be made. For example, elements of different implementations may be combined, supplemented, modified, or removed to produce other implementations. Further, various technologies may be used, combined, and modified to produce an implementation, such technologies including, for example, a variety of hardware, software, firmware, integrated components, discrete components, processing devices, memory or storage devices, communication devices, lenses, filters, display devices, and projection devices. Accordingly, other embodiments are within the scope of the following claims.

What is claimed is:
1. A method comprising:
   accessing images captured from an image sensor positioned on a device;
   identifying a first feature that is present in the images captured from the image sensor;

identifying a second feature that is present in the images captured from the image sensor, the second feature being different than and spaced apart from the first feature; and determining a description of motion of the device in a depth direction based on changes in distance between the first feature and the second feature in the images captured from the image sensor, the depth direction being a direction of movement substantially toward or substantially away from the first feature and the second feature.

2. The method of claim 1, further comprising:

prior to determining the description of motion of the device, determining that the first feature and the second feature are static features.

3. The method of claim 2, wherein determining that the first feature and the second feature are static features includes selecting the first feature and the second feature from a set of features present in the images captured from the image sensor based on similarity in direction and magnitude of flow vectors associated with the first feature and the second feature.

4. The method of claim 3, wherein the flow vectors are substantially parallel and of substantially equal magnitude.

5. The method of claim 1, wherein the second feature has a fixed physical relationship with the first feature.

6. The method of claim 1, further comprising:

determining user input for an application based on the determined description of motion of the device in the depth direction.

7. The method of claim 1, wherein the first feature includes a first object in the images, any part of the first object in the images, or a corner or edge of the first object in the images.

8. The method of claim 1, wherein a physical position of the first feature or the second feature does not change.

9. A device comprising:

at least one processor;

memory storing instructions that, when executed by the at least one processor, cause the device to:

access digital representations of a scene from a sensor coupled to the device;

identify a first feature that is present in the digital representations from the sensor;

identify a second feature that is present in the digital representations from the sensor, the second feature being different than and spaced apart from the first feature; and determine a description of motion of the device in a depth direction based on changes in distance between the first feature and the second feature in the digital representations from the sensor, the depth direction being a direction of movement substantially toward or substantially away from the first feature and the second feature.

10. The device of claim 9, wherein the memory stores additional instructions that, when executed by the at least one processor, further cause the device to:

prior to determining the description of motion of the device, determine that the first feature and the second feature are static features.

11. The device of claim 10, wherein determining that the first feature and the second feature are static features includes selecting the first feature and the second feature from a set of features present in the digital representations from the sensor based on similarity in direction and magnitude of flow vectors associated with the first feature and the second feature.

12. The device of claim 11, wherein the flow vectors are substantially parallel and of substantially equal magnitude.

13. The device of claim 9, wherein the memory stores additional instructions that, when executed by the at least one processor, further cause the device to:

determine user input for an application based on the determined description of motion of the device in the depth direction.

14. The device of claim 9, wherein the first feature includes a first object in the digital representations, any part of the first object in the digital representations, or a corner or edge of the first object in the digital representations.

15. The device of claim 9, wherein a physical position of the first feature or the second feature does not change.

16. The device of claim 9, further comprising the sensor, wherein the sensor comprises a camera configured to capture an image of the scene.

17. A non-transitory computer readable medium comprising a device having instructions stored thereon to:

access images captured from an image sensor positioned on an apparatus;

identify a first feature that is present in the images captured from the image sensor;

identify a second feature that is present in the images captured from the image sensor, the second feature being different than and spaced apart from the first feature; and determine a description of motion of the apparatus in a depth direction based on changes in distance between the first feature and the second feature in the images captured from the image sensor, the depth direction being a direction of movement substantially toward or substantially away from the first feature and the second feature.

18. The computer readable medium of claim 17, having additional instructions stored thereon to:

prior to determining the description of motion of the apparatus, determine that the first feature and the second feature are static features.

19. The computer readable medium of claim 17, having additional instructions stored thereon to:

determine user input for an application based on the determined description of motion of the apparatus in the depth direction.

20. The computer readable medium of claim 17, wherein the first feature includes a first object in the images, any part of the first object in the images, or a corner or edge of the first object in the images.

21. The computer readable medium of claim 17, wherein a physical position of the first feature or the second feature does not change.

22. A device comprising:

means for accessing images captured from an image sensor positioned on the device;

means for identifying a first feature that is present in the images captured from the image sensor;

means for identifying a second feature that is present in the images captured from the image sensor, the second feature being different than and spaced apart from the first feature; and means for determining a description of motion of the device in a depth direction based on changes in distance between the first feature and the second feature in the images captured from the image sensor, the depth direction being a direction of movement substantially toward or substantially away from the first feature and the second feature.

23. The device of claim 22, further comprising:
means for determining that the first feature and the second feature are static features prior to determining the description of motion of the device.

24. The device of claim 22, further comprising:
means for determining user input for an application based on the determined description of motion of the device in the depth direction.

25. The device of claim 22, wherein the first feature includes a first object in the images, any part of the first object in the images, or a corner or edge of the first object in the images.

26. The device of claim 22, wherein a physical position of the first feature or the second feature does not change.

* * * * *